C. H. GENTH.
WHEEL TIRE.
APPLICATION FILED SEPT. 23, 1911.
1,045,544.
Patented Nov. 26, 1912.
2 SHEETS—SHEET 2.
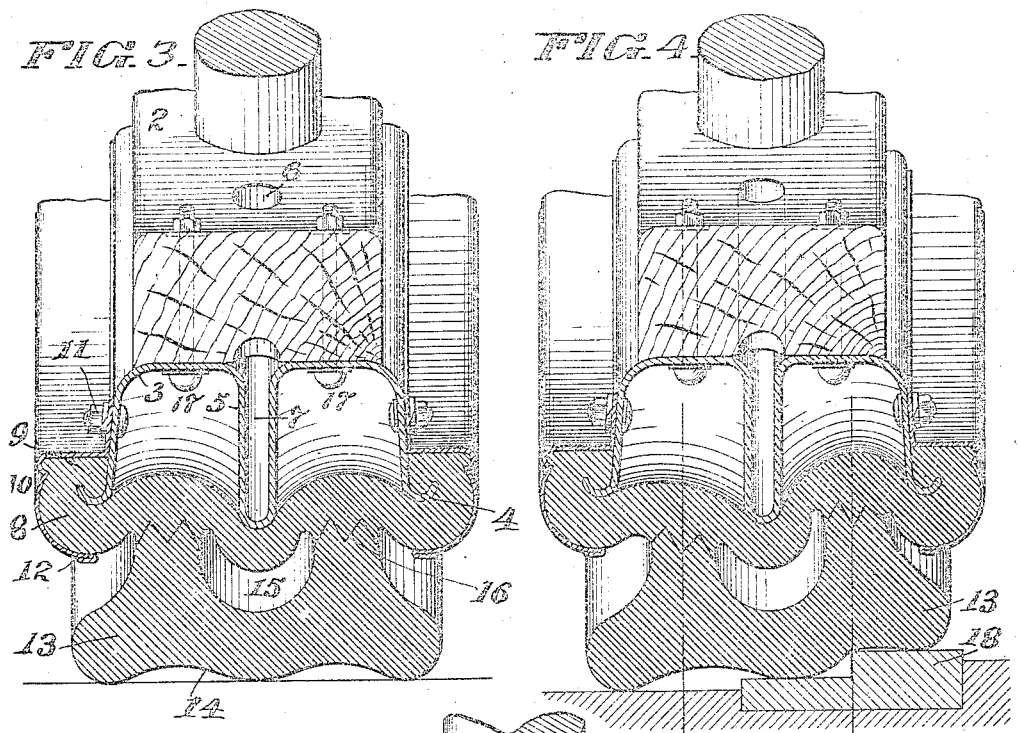

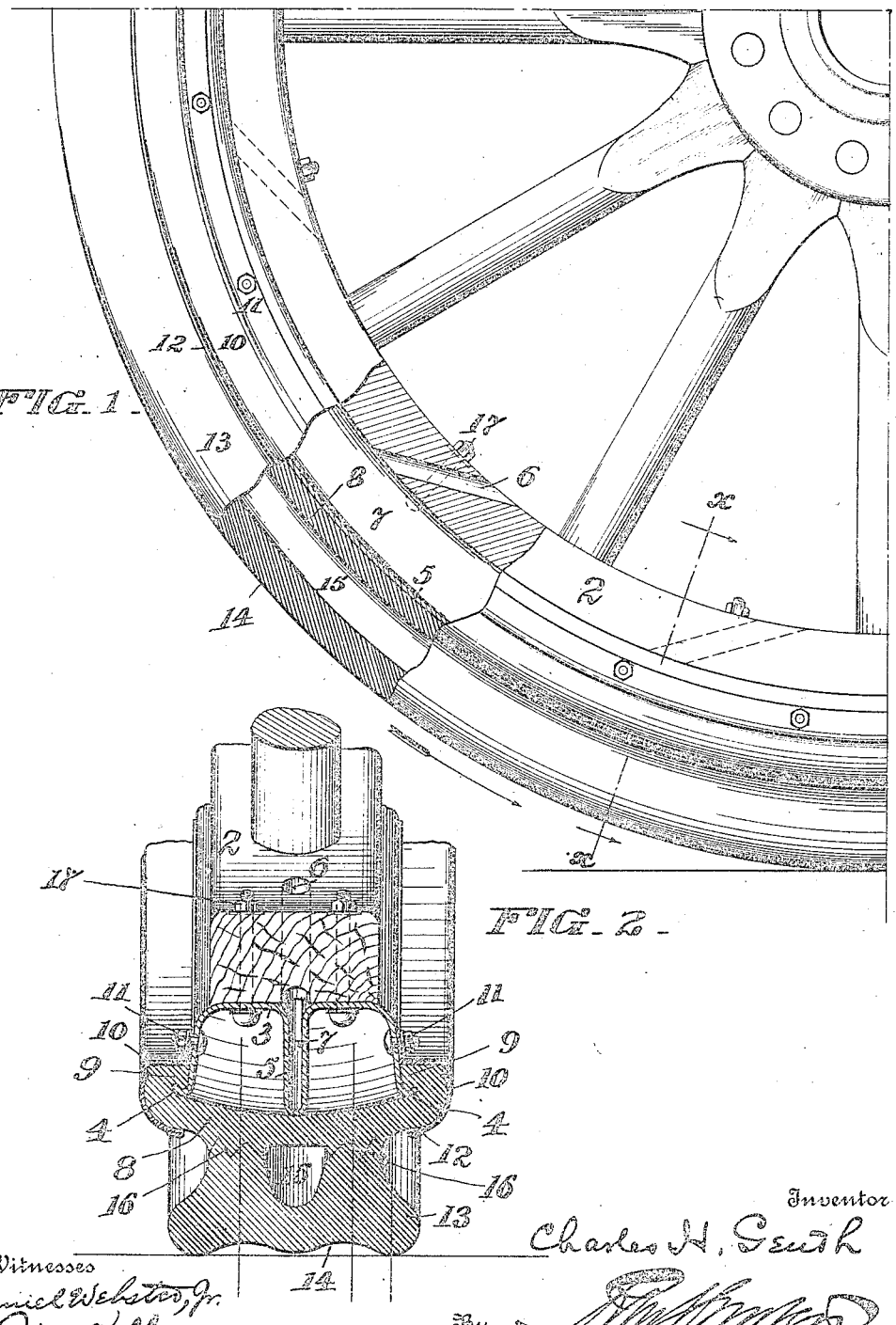

UNITED STATES PATENT OFFICE.

CHARLES H. GENTH, OF PHILADELPHIA, PENNSYLVANIA.

WHEEL-TIRE.

1,045,544.  Specification of Letters Patent.  Patented Nov. 26, 1912.

Application filed September 23, 1911. Serial No. 650,906.

*To all whom it may concern:*

Be it known that I, CHARLES H. GENTH, a citizen of the United States, and a resident of the city and county of Philadelphia, State of Pennsylvania, have invented an Improvement in Wheel-Tires, of which the following is a specification.

More particularly this invention relates to elastic tires for wheels, and the object is to provide a non-pneumatic elastic tire suitable for use in automobiles and other heavy vehicles in place of the pneumatic tires now in use.

It is one of the objects of my invention to provide a tire, the efficiency of which will not be affected by ordinary punctures, which render pneumatic tires useless.

It is also an object of my invention to provide a tire which will greatly overcome the tendency to slip or skid which is one of the chief dangers in the use of present pneumatic tires.

In the drawings: Figure 1 is a side elevation of part of a wheel provided with my improved tire, with a portion of the tire shown in longitudinal section in a vertical plane through the middle of the tire and wheel rim; Fig. 2 is a transverse vertical section on the line *x—x* of Fig. 1; Fig. 3 is a view similar to Fig. 2, but slightly enlarged showing the tire under compression; Fig. 4 is a similar view showing the tire under compression with its tread-portion acting on an uneven surface; and Fig. 5 is a view similar to Fig. 2 on a slightly enlarged scale showing a modification.

2 is the wheel-felly to which the tire is applied. The wheel proper may be of wood or metal and of any construction desired. Surrounding the perimeter of the felly 2 is a metal rim 3 of channel-shape in cross-section, which may be secured to the felly in any convenient manner, as by the bolts 17. This rim 3 is provided with one or more circular ribs 5 projecting from the bottom of the rim and dividing it into annular compartments. In the construction shown in Figs. 1–4 a single central annular rib is employed, but in the construction shown in Fig. 5 with a wider tire, intended more particularly for heavy service with trucks, and the like, two ribs are employed.

The outer or shoe-portion of the tire consists of an outer tread-portion 13 and a lower elastic portion 8 which are permanently connected together, with the sides of the elastic portion extended laterally to form elastic flanges which are secured by suitable clamps 10 to the sides of the rim 3. The shoe-portion is provided with one or more internal annular pockets 15 which are inclosed by the web of the elastic portion 8 and so located that they will be immediately adjacent to the ribs 5 with the elastic web 8 between.

The edges of the sides of the rim 3 are preferably provided with upturned rounded flanges 4, which engage recesses in the upturned edges 9 of the elastic flanges and the clamps 10 are preferably annular and of angular shape to fit about the edges of the elastic flanges and clamp them securely upon the flanged edges 4 of the rim. The clamping rings may be fastened to the sides of the rim by bolts 11.

When the tire is under compression, as shown in Fig. 3 the rib 5 acts upon the elastic web of the portion 8 over the pocket 15 and stretches it, while the adjacent elastic portions are forced up into the open spaces in the rim 3. The elastic portion is thus stretched both at the edges of the rim 3 and at the intermediate rib or ribs 5, and a greatly increased sustaining power is imparted to the wheel.

The neck of the tread-portion 13 where it joins or merges into the elastic portion 8 is of less width than the annular compartments in the rim so that the movements described will not be prevented by the thrust of the shoe portion upon the rim or clamping ring when the shoe-portion is forced upward.

In Fig. 4 I have shown the action when the tire is running on an uneven surface as upon a rail. In this case the side which is acted upon by the rail or elevation is forced upward to a much greater extent than the other side and the elasticity of the tire adapts itself to the inequality of the surface without affecting the perpendicularity of the wheel or jolting the car.

In the preferred form the periphery of the shoe is curved as shown to present two outer points of contact and also a central point of contact with hollows 14 between, and these hollows are so placed that the outer contact points of the shoe with the ground are wholly outside of the central line between the points of contact of the elastic portion 8 with the sides of the rim 3 and the central rib 5, as is indicated in Figs. 2, 4 and 5. It follows from this that, when the tire is under compression, the outer points of contact are forced outward and the tire has a spreading action, in addition to that which would result merely from the compression of an elastic body. This spreading action is very effective in overcoming the tendency of the tire to slide laterally or to "skid."

The outer or tread-portion 13 and the elastic portion 8 are permanently connected together to form one piece. The outer tread-portion must have the necessary hardness and toughness to withstand the wear to which it is subjected in service while the lower portion must have the elasticity necessary to accomplish the results described. The shoe may be made of one piece of rubber hard and tough at the outer tread portion and elastic at the flanges and web over the pocket 15, or it may be made of two distinct pieces united together as indicated at 16, in which case the connecting surfaces are preferably formed with complementary projections and recesses as shown.

In commercial practice, I prefer to form the shoe portion 13, of relatively hard rubber, in a suitable mold and with the inwardly projecting parts formed with circumferential grooves and projections, such as indicated at 16, for example, and separately mold the transverse elastic rubber portion 8 with complementary circumferential grooves and ribs to fit those of the inwardly projecting parts of the shoe portion 13, and these two contacting parts then vulcanized together to form an integral structure having a strong union between the parts 8 and 13. The irregular circumferential surface of union between the parts 8 and 13, indicated at 16, secure two important results, both of which are most vital in a tire of this character. By providing the circumferential grooves and projections, indicated at 16, I secure a very large increase in the vulcanized surface which unites the two parts 8 and 13 and thereby provide a union which would be equivalent to approximately twice the width of the inwardly projecting parts of the shoe portion. Further, by providing this particular character of union between the parts 8 and 13, it will be seen that in skidding, or tendency to skid, there will be the greatest possible resistance against the tearing of the shoe portion 13 from the elastic portion 8, as these projections on the two parts which interlock at their vulcanized union 16, will greatly increase the strength against tearing them apart when subjected to such strains. This particular character of union between the two parts is most important, because, commercially it is necessary to use a cheaper and harder material in the tread portion 13 than in the elastic portion 8.

I do not mean to limit my invention, in its broader features, to the particular construction of the channel-shaped ribbed rim, but I prefer to construct it of stamped sheet metal, with the rib 5 formed by a folded portion of the sheet and with the faces of the rib portion or portions separated to form an internal space or pocket 7, with which holes 6, extending through the felly communicate. These holes preferably incline forward in the direction of the forward movement of the wheel as is indicated in Fig. 1, and the air which enters through these holes and passes into the annular space 7 in the rib 5 cools the rib and also acts to prevent the rim and entire tire from becoming over-heated.

I do not claim in this application the provision of the felly with air passages leading into the rim, but I reserve the right to protect the same by a separate application to be filed as a division of this application.

What I claim is as follows:

1. As a new article of manufacture, a rubber tire comprising an outer shoe portion of relatively hard rubber having a flattened tread and a plurality of inwardly directed portions of relatively narrow width to provide widely overhanging sides adjacent to the tread, and an inner transverse portion of relatively elastic rubber having a vulcanized circumferential union with the narrow inwardly projecting portions of the outer shoe portion, the transverse line of the union being of greater length than the transverse thickness of the inwardly projecting parts to give strength to the union and the lateral parts of the transverse portion of relatively elastic rubber extending radially and inward to form circumferential flanges grooved upon their inner side walls.

2. A wheel-tire consisting of a rim of channel-shape having flanged sides and an annular rib between them, combined with a shoe of rubber embracing an outer tread portion and a lower elastic portion permanently connected together and provided with an annular pocket between them located adjacent to and over the annular rib of the rim, the sides of the lower elastic portion being extended laterally to form elastic flanges secured to the sides of the rim, and the periphery of the tread portion being of irregular outline having hollows under the central lines between the sides of the rim and its central rib with points of contact in substantial alinement with the central rib and side flanges.

3. The combination of a wheel rim having two circumferential grooves separated by a radial rib and also having its sides curved outward at their free edges, with a rubber tire comprising a transverse web of flexible rubber resting over the central circumferential rib and the channels of the rim and having lateral edges projecting radially inward and provided with inwardly directed side grooves into which the curved edges of the rim are received and said elastic web provided with a tread portion of relatively hard rubber providing a wide annular tread portion with circumferential inwardly directed portions of narrow thickness vulcanized permanently to the elastic web immediately above the circumferentially grooved portions of the tire and also providing a hermetically sealed annularly arranged pocket bounded on the outer and side portions by the relatively hard rubber and on the inner part by the relatively elastic rubber which is arranged over the circumferential rib of the rim, and annular clamping rings for holding the elastic edges of the rubber tire to the curved edges of the rim.

In testimony of which invention, I hereunto set my hand.

CHARLES H. GENTH.

Witnesses:
R. M. KELLY,
E. W. SMITH.